United States Patent [19]

Asai

[11] Patent Number: 4,831,391

[45] Date of Patent: May 16, 1989

[54] LIQUID INJECTION RECORDING SYSTEM, A LIQUID INJECTION HEAD, A BASE PLATE FOR THE RECORDING HEAD, AND A RECORDING APPARATUS HAVING THE LIQUID INJECTION RECORDING HEAD

[75] Inventor: Akira Asai, Machida, Japan

[73] Assignee: Canon Kabushiki Kaisha, Tokyo, Japan

[21] Appl. No.: 236,290

[22] Filed: Aug. 25, 1988

Related U.S. Application Data

[63] Continuation of Ser. No. 117,527, Nov. 6, 1987, abandoned.

[30] Foreign Application Priority Data

Nov. 10, 1986 [JP] Japan ............................... 61-265649

[51] Int. Cl.$^4$ ............................................ G01D 15/16

[52] U.S. Cl. ................................ 346/140 R; 338/309; 338/314; 338/320

[58] Field of Search .......................... 346/140, 76 PH; 338/308, 309, 314, 320, 322

[56] References Cited

U.S. PATENT DOCUMENTS

| | | |
|---|---|---|
| 4,339,762 | 7/1982 | Shirato et al. . |
| 4,450,457 | 5/1984 | Miyachi et al. . |
| 4,545,881 | 10/1985 | Shinmi et al. . |
| 4,577,202 | 3/1986 | Hara . |

FOREIGN PATENT DOCUMENTS

| | | |
|---|---|---|
| 55-132258 | 10/1980 | Japan . |
| 55-132259 | 10/1980 | Japan . |

*Primary Examiner*—Joseph W. Hartary

*Attorney, Agent, or Firm*—Fitzpatrick, Cella, Harper & Scinto

[57] ABSTRACT

In a liquid injection recording system wherein an electrical signal is input to an electro-thermal conversion element to cause it to generate heat and produce bubbles in liquid and the liquid is injected by the action of the bubbles, a substance whose electrical resistance is varied by phase transition is used for a portion of the electro-thermal conversion element and harmonious recording is effected by the utilization of the phase transition characteristic of the substance.

17 Claims, 3 Drawing Sheets

LIQUID INJECTION RECORDING SYSTEM, A LIQUID INJECTION HEAD, A BASE PLATE FOR THE RECORDING HEAD, AND A RECORDING APPARATUS HAVING THE LIQUID INJECTION RECORDING HEAD

This application is a continuation of application Ser. No. 117,527 filed Nov. 6, 1987, now abandoned.

BACKGROUND OF THE INVENTION

1. Field of the Invention

This invention relates to a liquid injection recording system in which the bubbling of liquid caused by the power supply for heating of an electro-thermal conversion element is utilized to form flying liquid droplets and the liquid droplets are discharged to a recording medium to thereby accomplish recording of information such as characters, and also relates to a liquid injection recording head, a base plate for the recording head, and a recording apparatus having the liquid injection recording head.

2. Related Background Art

In the liquid injection recording system of the type utilizing heat energy, as the technique for accomplishing smooth harmonious recording over a wider range, there are generally known a technique whereby a heat generation gradient is caused in an electro-thermal conversion element (Japanese Laid-Open Patent Application No. 132258/1980 (U.S. Pat. No. 4,339,762)) and a technique which uses a plurality of electro-thermal conversion elements to which signals can be independently input (Japanese Laid-Open Patent Application No. 132259/1980).

The former harmonious recording system, in which a heat generation gradient is caused in an electro-thermal conversion element, can provide analog harmony in which the amount of liquid injected can be continuously freely changed by continuously changing the driving voltage or the drive pulse width. Accordingly this system has the advantage that it can provide abundant harmony while, on the other hand, it has sometimes suffered from the problem peculiar to the analog system that the amount of liquid injected is varied under the influence of even a slight change in temperature and other external conditions.

In contrast, the latter recording system, using a plurality of electro-thermal conversion elements to which signals can be independently input, is a digital harmonious system and therefore, it is difficult for such system to be affected by external factors such as temperature, etc., but to make the maximize harmoniousness, a number of independent electro-thermal conversion elements must be provided, and this has led to the problem that electrical wiring becomes very complex.

SUMMARY OF THE INVENTION

In view of the above-noted problems, it is an object of the present invention to provide a liquid injection recording system which eliminates the complexity of the wiring which poses a problem when digital harmonious recording is to be realized.

It is another object of the present invention to provide a liquid injection recording system in which an electrical signal is input to an electro-thermal conversion element to cause it to generate heat and produce bubbles in liquid and the liquid is injected by the action of said bubbles, characterized in that a substance whose electrical resistance is varied by phase transition is used for a portion of said electro-thermal conversion element and harmonious recording is effected by the utilization of the phase transition characteristic of said substance.

It is still another object of the present invention to provide a liquid injection recording head provided with a base plate having an electro-thermal conversion element provided with a resistance material provided on a support member and a set of electrodes electrically connected to said resistance material and disposed at an interval, a heat-acting zone including a portion in which heat energy generated by said electro-thermal conversion element acts on liquid, and a discharge port which is a portion which is communicated with said heat-acting zone and through which the liquid is discharged by the action of said heat energy, characterized in that at least a part of said resistance material consists of a substance whose electrical resistance is varied by phase transition.

It is yet still another object of the present invention to provide a base plate for a liquid injection recording head having an electro-thermal conversion element provided with a resistance material provided on a support member and a set of electrodes electrically connected to said resistance material and disposed at an interval, characterized in that at least a part of said resistance material consists of a substance whose electrical resistance is varied by phase transition.

It is a further object of the present invention to provide a recording apparatus having a liquid injection recording head provided with a base plate having an electro-thermal conversion element provided with a resistance material provided on a support member and a set of electrodes electrically connected to said resistance material and disposed at an interval, a heat-acting zone including a portion in which heat energy generated by said electro-thermal conversion element acts on liquid, and a discharge port which is a portion which is communicated with said heat-acting zone and through which the liquid is discharged by the action of said heat energy, and drive means for driving said recording head, characterized in that at least a part of said resistance material consists of a substance whose electrical resistance is varied by phase transition.

In the present invention, a substance whose electrical resistance is varied by phase transition is used for at least a part of the electro-thermal conversion element and therefore, the amount of heat generated in the portion which has caused phase transition is varied by the variation in the electrical resistance based on the phase transition and the volume of bubbles generated is varied and thus, the amount of liquid injected becomes variable, whereby harmonious recording by digital techniques can be accomplished without complicating the wiring.

DESCRIPTION OF THE PREFERRED EMBODIMENTS

An embodiment of the present invention will hereinafter be described in detail with reference to the drawings.

Figure 1A:
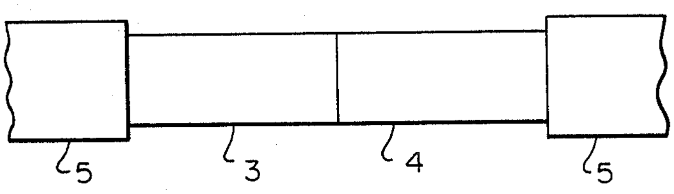
FIGS. 1A and 1B are a plan view and a cross-sectional view, showing the construction of an embodiment of the invention.
Figure 1B:
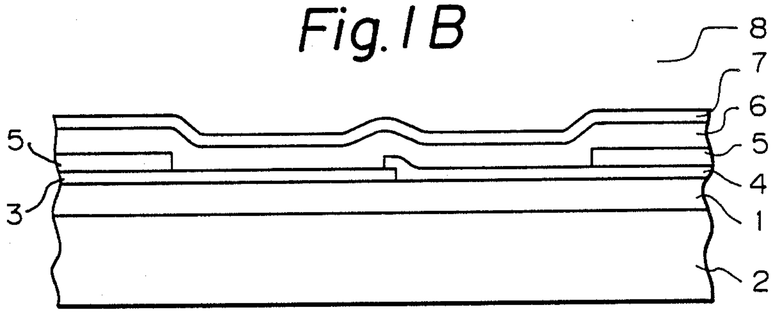

FIGS. 1A and 1B show a schematic plane view and a schematic cross-sectional view, respectively, of a base plate provided with an electro-thermal conversion element used in a liquid injection recording head to which the system of the present invention is applied. As shown in FIGS. 1A and 1B, the electro-thermal conversion element of the present embodiment is one provided by forming a layer 3 of resistance material $HfB_2$ having a thickness of 0.13 μm on a substrate 2 (a support member) of Si provided with a surface layer 1 of oxide $SiO_2$ (which is not always necessary) having a thickness of about 5 μm as a heat accumulating layer, by sputtering, thereafter removing a part of the $HfB_2$ layer 3 by etching, forming a layer 4 of resistance material $V_8C_7$ having a thickness of 0.13 μm by sputtering and forming Al layers (electrodes) 5 having a thickness of 0.5 μm by the EB (electron beam) evaporation method, thereafter effecting the patterning by etching, and thereafter forming an insulating layer 6 of $SiO_2$ having a thickness of 1.9 μm and a protective layer 7 of Ta having a thickness of 0.55 μm by sputtering. Liquid such as ink is directed to a portion designated by 8 on the protective layer 7.

The size of the above-mentioned layer of resistance material which generates heat when an electric power is supplied thereto is such that the width is 30 μm and the length (the direction in which an electric current flows) is 140 μm, and the left half layer 3 of resistance material a viewed in FIG. 1 is constructed of $HfB_2$ and the right half layer 4 of resistance material is constructed of $V_8C_7$ which is one of substances whose electrical resistance is varied by phase transition as will be described later.

Figure 2:
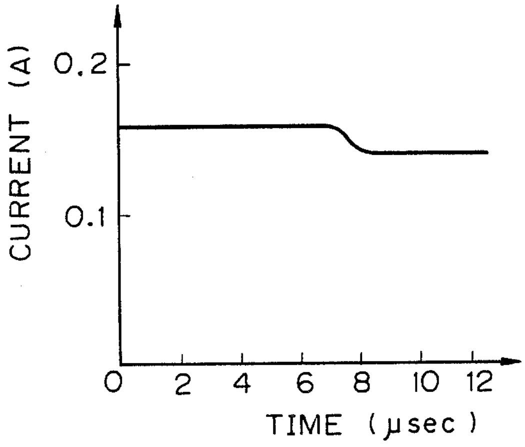
FIG. 2 is a graph showing the relation between the variations in time and current in the embodiment of FIGS. 1A and 1B.

When a rectangular pulse of heating pulse width 12 μsec., voltage 20V and frequency 1 KHz was applied between the electrodes 5 of FIGS. 1A and 1B and the electric current flowing therethrough was measured, there was obtained a result as shown in FIG. 2.

It is generally known that $V_8C_7$ causes phase transition at a temperature of 1123° C. and its specific electrical resistance varies from 115 μΩcm (below 1123° C.) to 135 μΩcm (above 1123° C.). It is because the temperature of the layer 4 of resistance material $V_8C_7$ exceeded 1123° C. due to the temperature rise resulting from heating and the layer 4 of $V_8C_7$ caused phase transition that in FIG. 2, the current value is low in the vicinity of the lapse of 8 μsec. after heating. Also, it is because a finite time is taken for the phase transition that the resulting variation in the current value is gentle.

If the resistance of the Al electrodes 5 is Rc and the resistance of the layer 3 of resistance material $HfB_2$ is $R_1$ and the resistance of the layer 4 of resistance material $V_8C_7$ is $R_2$, the current I flowing to the resistance materials 3 and 4 when the driving voltage is Vop is given by the following equation (1):

$$I = \frac{Vop}{Rc + R_1 + R_2} \quad (1)$$

Accordingly, if the amounts of heat per unit time generated in the layer 3 of resistance material $HfB_2$ and the layer 4 of resistance material $V_8C_7$ are $Q_1$ and $Q_2$, respectively, $Q_1$ and $Q_2$ are given by the following equations (2) and (3), respectively:

$$Q_1 = \left(\frac{Vop}{Rc + R_1 + R_2}\right)^2 R_1 \quad (2)$$

$$Q_2 = \left(\frac{Vop}{Rc + R_1 + R_2}\right)^2 R_2 \quad (3)$$

The specific electrical resistance of the layer 3 of resistance material $HfB_2$ in the present embodiment was 250 μΩcm, and the resistances $R_1$ and $R_2$ were $R_1 > R_2$. Accordingly, from equations (2) and (3) above, $Q_1 > Q_2$, but the amount of generated heat $Q_1$ per unit time of the layer 3 of resistance material $HfB_2$ decreases and the amount of generated heat $Q_2$ per unit time of the layer 4 of resistance material $V_8C_7$ increases when the resistance $R_2$ of the layer 4 of resistance material $V_8C_7$ rises. That is, with the lapse of 8 μsec. after heating as the boundary, the former amount of generated heat $Q_1$ decreased and the latter amount of generated heat $Q_2$ increased.

By thus changing the heating pulse width applied between the electrodes 5 by the use of the electro-thermal conversion element as shown in FIG. 1, harmonious recording which varies smoothly has become possible. That is, it has been confirmed that when the heating pulse width is 6 μsec., only that portion of liquid 8 which is above the layer 3 of resistance material $HfB_2$ is foamed and when the heating pulse width is 12 μsec., that portion of the liquid which is above both of the layer 3 of resistance material $HfB_2$ and the layer 4 of resistance material $V_8C_7$ is foamed. The then amount of discharged liquid is shown in Table 1 below.

TABLE 1

| Pulse width | Amount of discharged liquid ($10^{-6}$ $mm^3$) |
|---|---|
| 6 μsec. | 86 |
| 12 μsec. | 118 |

In the above-described embodiment, only one kind of substance undergoes phase transition, but harmonious recording could be accomplished by using a plurality of substances which make phase transition (such as, for example, $V_6C_5$ and Ta).

It is not always necessary to arrange a plurality of resistance materials in series, but the resistance materials may be arranged in parallel or in any combination of series and parallel.

Also, to cause phase transition, besides the method of increasing temperature, a method of varying any strength-indicative state parameter (such as pressure, magnetic field or chemical potential) can be used.

Of course, the present invention is not restricted to the above-described embodiment, but is usable for various modifications as long as they do not depart from the subject of the present invention.

A preferred example of the liquid injection recording head used in the present embodiment will now be described with reference to FIG. 3.

Figure 3:
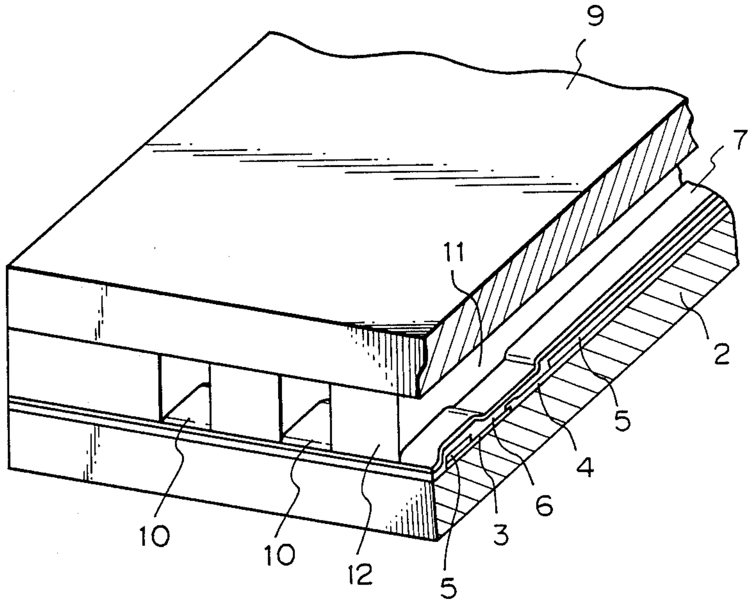
FIG. 3 is a schematic perspective view for illustrating a preferred embodiment of the liquid injection recording of the present invention.

In FIG. 3 the reference numeral 2 designates a support member, the reference numerals 3 and 4 denote layers of resistance material, the reference numeral 5 designates electrodes, the reference numeral 6 denotes an insulating layer, the reference numeral 7 designates a protective layer, the reference numeral 9 denotes a top plate, the reference numeral 10 designates discharge ports, and the reference numeral 11 denotes a heat-acting zone.

As shown, the layers 3 and 4 of resistance material have been provided on the support member 2 and the electrodes have been provided on the layers 3 and 4 of resistance material. The insulating layer 6 as a protective layer for preventing entry of liquid has been provided between the electrodes 5 of the layers 3 and 4 of resistance material and on at least a portion of each electrode 5, and the protective layer 7 has been further provided on the insulating layer 6. The electro-thermal conversion element has at least the layers of resistance material and the electrodes, and the protective layer 7 need not always be provided if the layers of resistance material and/or the electrodes have sufficient corrosion resistance to liquid and have resistance to mechanical damages caused by the cavitation during the extinction of bubbles. Likewise, the insulating layer 6 need not always be provided if the liquid has a necessary resistance value.

In FIG. 3, walls 12 have been formed on the base plate so as to partition the electro-thermal conversion element provided on the support member 2, and the top plate 11 has been further provided on the walls 12 to form the heat acting zone 11 and the discharge ports 10 communicating with the heat-acting zone 11. (In FIG. 3, the surface layer of oxide is not shown.)

The heat-acting zone 11 is an area including a portion in which the heat energy generated by the electro-thermal conversion element acts on the liquid (ink) introduced into the recording head, and approximately, it is a liquid path (an area into which the liquid is introduced) corresponding to the upper area between the electrodes connected to the layers of resistance material.

Figure 5:
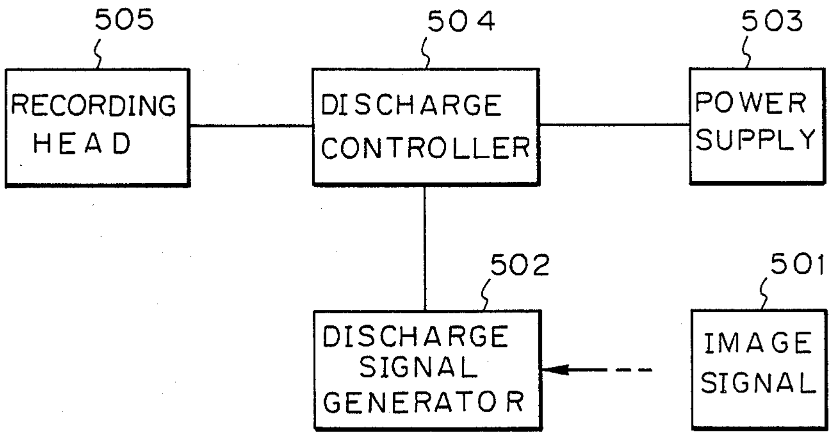
FIG. 5 illustrates a preferred embodiment of a block diagram for driving the liquid injection recording head of the present invention.

The liquid injection recording head thus constructed is driven by circuitry such as that shown in block diagram form in FIG. 5.

That is, an image signal 501 is input to a discharge signal generator 502 and a signal corresponding to the image signal 501 is input to a discharge controller 504. The discharge controller 504 is connected to a power supply 503 and inputs a signal corresponding to the image signal to a recording head 505, thereby effecting recording. In the present invention, the functions of the discharge signal generator 502, the discharge controller 504 and the power supply 503 are generically named drive means.

Figure 4:
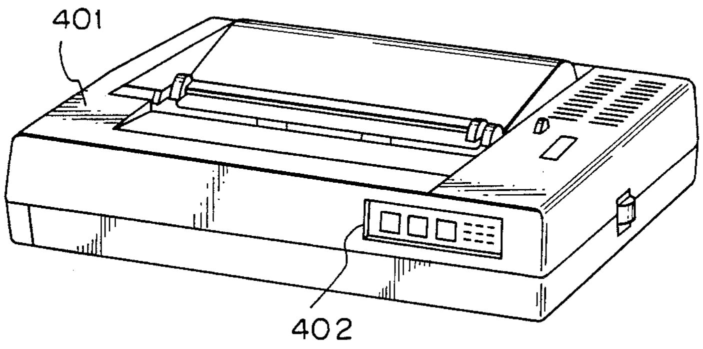
FIG. 4 is a schematic perspective view for illustrating a recording having the liquid injection recording of the present invention.

FIG. 4 shows a schematic perspective view of an apparatus having the liquid injection recording head of the present invention (not shown).

In FIG. 4, the reference numeral 401 designates an apparatus body cover, and the reference numeral 402 denotes an operating panel on which is provided a switch and/or a display device connected to various control mechanisms for controlling the apparatus.

The liquid injection recording head of the present invention is covered with the apparatus body cover 401. This recording apparatus is the same as the generally known recording apparatus in that a recording member is disposed in opposed relationship with the orifice of the recording head.

The recording head of the present invention disposed in such a recording apparatus could always accomplish recording of high accuracy and high quality even when the recording operation was performed for a long time.

As described above, according to the present invention, the electro-thermal conversion element is constructed with a substance which causes phase transition being used for a portion thereof, and this leads to the obtainment of the effect that harmonious recording can be accomplished by simple wiring.

I claim:

1. A liquid injection recording system for injecting liquid by utilizing thermal energy generated upon application of an electrical signal to an electro-thermal conversion element, characterized in that a substance whose electrical resistance is varied by phase transition is used for a portion of said electro-thermal conversion element and harmonious recording is effected by the utilization of the phase transition characteristic of said substance.

2. A liquid injection recording system according to claim 1, wherein said phase transition is caused by the heat generated by said electro-thermal conversion element.

3. A liquid injection recording system according to claim 1, wherein said substance is at least a part of the resistance material of said electro-thermal conversion element.

4. A liquid injection recording head provided with a base plate having an electro-thermal conversion element provided with a resistance material provided on a support member and a set of electrodes electrically connected to said resistance material and disposed at an interval, a heat-acting zone including a portion in which heat energy generated by said electro-thermal conversion element acts on liquid, and a discharge port which is a portion which is communicated with said heat-acting zone and through which the liquid is discharged by the action of said heat energy, characterized in that at least a part of said resistance material consists of a substance whose electrical resistance is varied by phase transition.

5. A liquid injection recording head according to claim 4, wherein said substance is a substance in which phase transition occurs due to heat energy.

6. A liquid injection recording head according to claim 5, wherein said substance is a substance chosen from among $V_8C_7$, $V_6C_5$ and Ta.

7. A liquid injection recording head according to claim 4, wherein said support member has a heat accumulating layer.

8. A liquid injection recording head according to claim 4, wherein said electro-thermal conversion element has a protective layer on said heat-acting zone side.

9. A liquid injection recording head according to claim 4, wherein said substance is connected to one of said electrodes and is connected to the other of said electrodes through a resistance material.

10. A liquid injection recording head according to claim 4, wherein said substance and said resistance material are connected to said set of electrodes and said substance is disposed adjacent to said resistance material.

11. A liquid injection recording head according to claim 10, wherein said substance and said resistance material are in contact with each other.

12. A base plate for a liquid injection recording head having an electro-thermal conversion element provided with a resistance material provided on a support member and a set of electrodes electrically connected to said resistance material and disposed at an interval, characterized in that at least a part of said resistance material consists of a substance whose electrical resistance is varied by phase transition.

13. A base plate according to claim 12, wherein said substance is a substance in which phase transition occurs due to heat energy.

14. A base plate according to claim 13, wherein said substance is chosen from among $V_8C_7$, $V_6C_5$ and Ta.

15. A recording apparatus having a liquid injection recording head provided with a base plate having an electro-thermal conversion element provided with a resistance material provided on a support member and a set of electrodes electrically connected to said resistance material and disposed at an interval, a heat-acting zone including a portion in which heat energy generated by said electro-thermal conversion element acts on liquid, and a discharge port which is a portion which is communicated with said heat-acting zone and through which the liquid is discharged by the action of said heat energy, and drive means for driving said recording head, characterized in that at least a part of said resistance material consists of a substance whose electrical resistance is varied by phase transition.

16. A recording apparatus according to claim 15, wherein said substance is a substance in which phase transition occurs due to heat energy.

17. A recording apparatus according to claim 16, wherein said substance is a substance chosen from among $V_8C_7$ , $V_6C_5$ and Ta.

* * * * *